Oct. 20, 1970 M. CAMRAS 3,534,966
TAPE DRIVE SYSTEM
Filed Dec. 11, 1967 2 Sheets-Sheet 1
FIG. 1
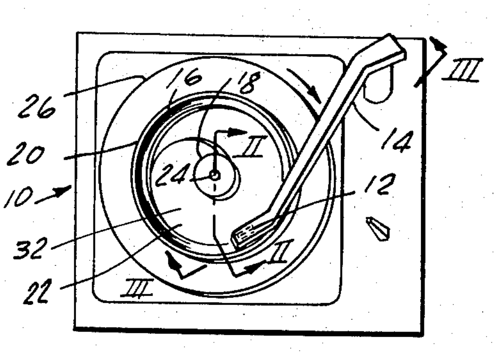
FIG. 4
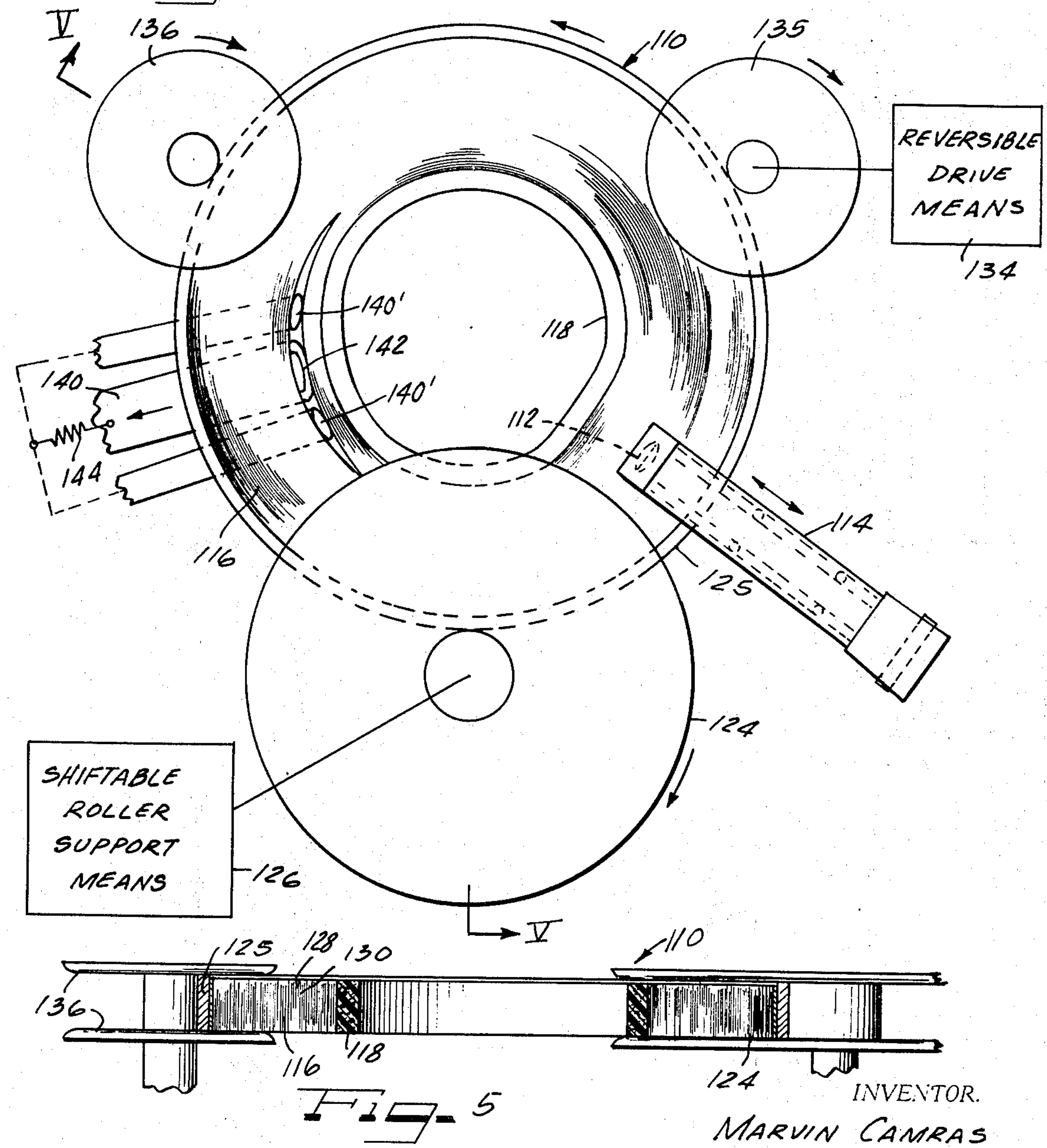
FIG. 5
INVENTOR.
MARVIN CAMRAS
BY Hill, Sherman, Meroni, Gross + Simpson
ATTORNEYS Oct. 20, 1970 M. CAMRAS 3,534,966

TAPE DRIVE SYSTEM

Filed Dec. 11, 1967 2 Sheets-Sheet 2

INVENTOR.
MARVIN CAMRAS

BY Hill, Sherman, Meroni, Gross & Simpson ATTORNEYS

United States Patent Office 3,534,966

Patented Oct. 20, 1970

3,534,966

TAPE DRIVE SYSTEM

Marvin Camras, Glencoe, Ill., assignor to IIT Research Institute, Chicago, Ill., a corporation of Illinois Filed Dec. 11, 1967, Ser. No. 689,508
Int. Cl. G11b 5/48
U.S. Cl. 274—4 5 Claims

ABSTRACT OF THE DISCLOSURE

A tape drive system including a record assembly having a record tape formed in a single coil, a retainer for retaining the coil in its wound configuration while accommodating the insertion of a scanning head between the turns of the coil and into scanning relation to the record tape. The invention further includes a method of tape recording and reproducing for a record tape of a flexible strip configuration formed in a continuous loop.

BACKGROUND OF THE INVENTION

This invention pertains to tape drive systems, and more particularly to a method and apparatus for recording and reproducing on a single coil of record tape of a flexible strip configuration.

PRIOR ART

It is known to provide a supported roll of tape. In such systems, a spiral spool of record tape has been provided on a plate. The end of the tape is clamped into a holder radially disposed from the spool of tape. A transducer or pickup device is secured by an arm in scanning relation to the record tape. The transducer is glided between the coils of the spirally wound record tape and thereby picks up the magnetic recording from the tape without necessitating the unrolling thereof. The arm permits insertion of the pickup device into the spool of tape at any desired point. This system is analogous to that for a disc recording.

Similarly, other magnetic recording systems are known which may be characterized as "belt" type systems wherein a single belt or a helically wound strip of magnetic tape is recorded and reproduced by passing a transducer head in a helix conforming to the outer configuration of the belt. This system permits access to the information on the belt requiring only a longitudinal and rotative adjustment or the belt in order to secure the desired place thereon.

It is advantageous in the recording by magnetic means of information on a flexible record medium such as a tape to wind the tape so that the adjacent turns do not slip against each other, as this has been found to be a source of trouble in prior art continuous loop cartridges.

SUMMARY

An object of the present invention is to provide a tape drive system of the single coil type.

A further object of the present invention is to provide a tape drive system which provides accurate recording on a flexible record medium, and rapid accessibility to all portions of the record medium.

Still a further object of the present invention is to provide a tape drive system for a cartridge type package removable from a recording and reproducing device.

Yet a further object of the present invention is to provide a supported roll tape system in which adjacent turns of the roll are separated from each other.

Still another object of the present invention is to provide a tape drive system for a multiple track single coil tape in which multiple transducer heads may be engaged simultaneously with different turns of the record tape and thereby permit multiple scanning, switching without interruption, and instant access to all portions of the record tape.

Yet another object of the present invention is to provide a tape record of a single roll type having a flexible inner rim to allow a transducer head to be inserted between turns of the tape.

Another object of the present invention is to provide a tape record which is capable of recording multiple tracks and is self supporting.

Another further object of the present invention is to provide a tape record of a single roll type having a radial ribbed support adapted to maintain the tape out of contact with dirt or the like which may accumulate between the turns of the tape.

An object of the present invention is to provide an automatic reset for the tone arm to allow repeated playing.

An object of the present invention is to provide a head positioner with an automatic reset for the tone arm to allow repeated playing and selection of multiple tracks on the record tape.

An object of the present invention is to provide a tape drive system for a coil record member with multiple tracks accessible without uncoiling the record.

Still other and further objects and features of the present invention will become apparent to those skilled in the art from a consideration of the following specification and the accompanying drawings wherein:

On the drawings:

FIG. 1 is a top plan view of a tape drive system in accordance with the principles of the invention;

FIG. 4 is a schematic and top plan partial view of an alternative embodiment of the present invention;

FIG. 5 is a partial sectional view taken along the line V—V of FIG. 4;

As shown on the drawings:

Figures 2, 3, 6, 7:
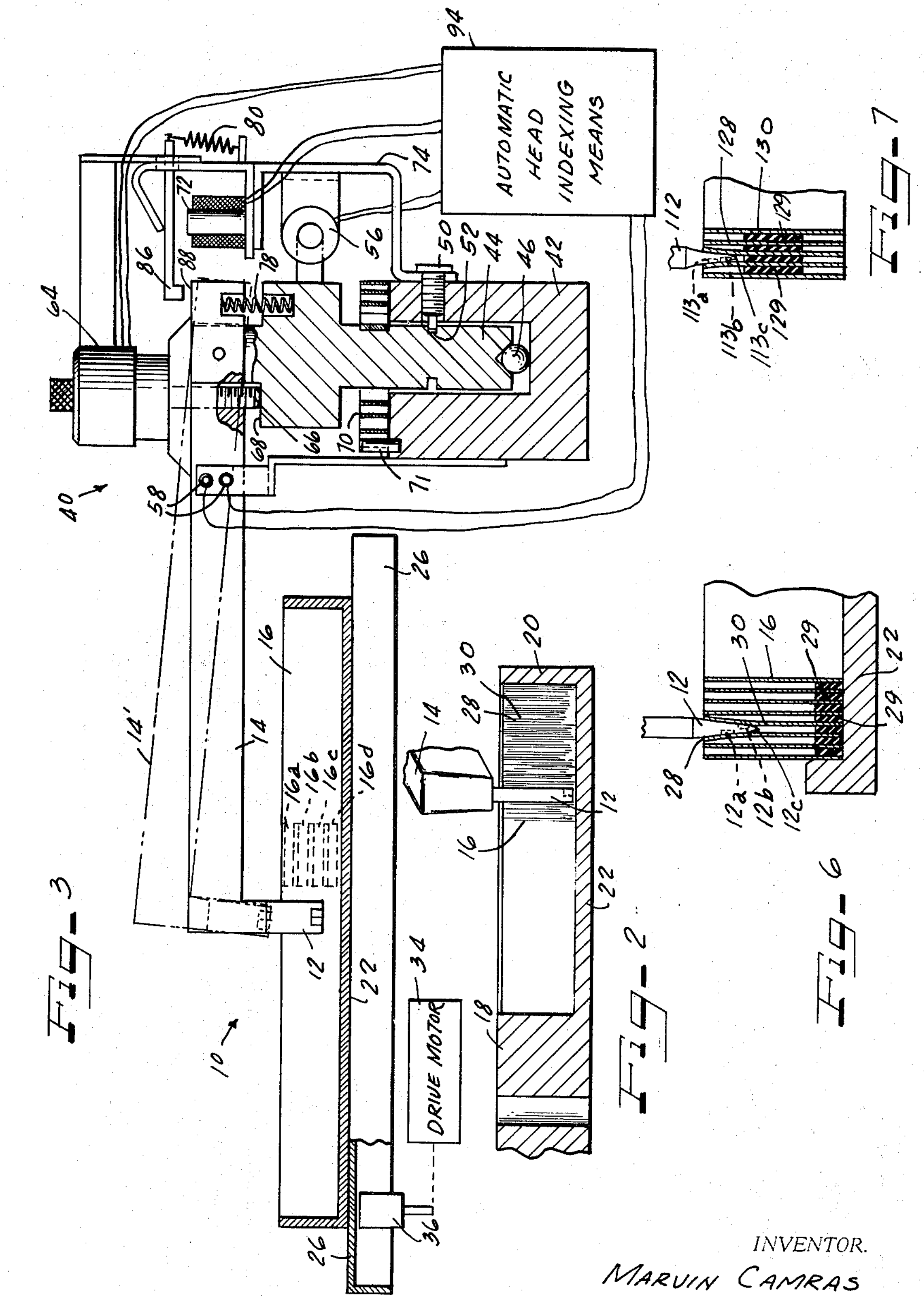
FIG. 2 is an enlarged partial sectional view taken along the line II—II of FIG. 1.
FIG. 3 is an enlarged partial sectional and schematic view taken along the line III—III of FIG. 1.
FIG. 6 is an enlarged partial sectional view of a magnetic head passing between coils of the record medium.
FIG. 7 is an enlarged partial sectional view of a coil of the magnetic record medium showing a spacing therefor.

The principles of this invention are particularly useful when embodied in a tape drive system for a flexible magnetic record medium as illustrated in FIG. 1, generally indicated by the numeral 10.

The tape drive system 10 has a magnetic transducer head 12 mounted on a tone arm 14, and bears against a magnetic record tape 16 which is supported between a pair of concentric rims 18 and 20 of a plate-like cylindrical retainer 22. The plate 22 is adapted to be rotated about a shaft 24 by a turntable 26.

The tone arm 14 is set into operative relationship with the tape 16, FIG. 3, from the dotted line position indicated at 14'. The tape 16 is wound with adjacent turns 28, 30 directly engaged with one another, FIG. 2.

With the tone arm 14 set in the full line position, FIG. 3, the recording is started with the tone arm set into the open area 32 near the center of the plate 22. The tape 16 is attached to a leader at the inner rim 24 of the plate 22. The plate 22 is rotated, and the tape 16 moves past the head 12 in an inward spiral. When the outer rim 20 is approached, the tone arm 14 is lifted into the dotted line position 14' and immediately replaced at the center to play another track at a different depth of the tape 16, or to repeat the same track.

In a specific embodiment of the invention, the tape 16 is a half inch tape having four channels **16*a*, 16*b*, 16*c*** and 16_d_, FIG. 3. The head 12 is insertable between adjacent turns 28, 30 of the coil for longitudinal scanning of the record tape 16 as the coil is rotated with the plate 22. The plate 22 may be ribbed to support the tape above accumulations of dust, dirt, or the like.

The record tape 16 is a flexible strip in which each turn thereof directly engages adjacent turns. The record tape 16 passes in scanning relationship to the head 12 which progressively deflects the record tape in the radial direction as it moves along the successive turns of the coil.

The plate 22 is driven about the central axis 24 by a drive motor 34 which is connected by a friction roll 36 to the turntable 26. The lateral and vertical position of the head 12 is adjusted by means of an automatic head indexing system generally indicated at 40, FIG. 3. The head indexing system includes a base 42 adapted to receive a shaft which is mounted relative to the base 42 on a bearing 46. The range of motion is set by means of a set screw 50 which engages an annular groove 52 in the side of the shaft 44. The shaft 44 is thereby allowed to rotate in the base 42 while retained by the set screw 50. The position of the tone arm 14 is controlled by a plurality o f solenoids which are adapted to adjust the tone arm 14. In the horizontal plane, a solenoid 56 is mounted in operative relationship to the shaft 44.

The indexing system 40 has a sensor 58 which is mounted on the base 42 in sensing relationship to the outer position of the tone arm 14. The tone arm 14 is biased outwardly by a coil spring 70 secured on the base 42 by a pin 71.

The tone arm 14 is adjusted in the vertical plane by means of a rachet relay 64 mounted on the tone arm 14 which drives the tone arm relative to the member 44 through a cam or a screw 66 that bears on the top surface 68 of the shaft 44. The tone arm 14 will stop at different predetermined heights as determined by the screw 66. A vertical removing solenoid 72 is mounted on an arm 74 extending from the base 42. The tone arm 14 is normally biased in the vertical direction by a spring 78 mounted between the adjusting member 44 and the tone arm 14. The armature of the solenoid 72 when actuated moves an angle arm 86 against a rear surface 88 of the tone arm 14 thereby raising the tone arm out of engagement with the record tape 16. The solenoids 56, 64 and 72 are controlled by an automatic head indexer 94 during the changing cycle.

In operation, the automatic head indexer 40 responds when the tone arm 14 reaches the preset end position to close the sensor contacts 58 thereby actuating the solenoid 72 to cause the arm 86 to contact the rear surface 88 to lift the tone arm 14 out of engagement with the tape 16 to the dotted lines position 14'. Shortly thereafter, the automatic head indexer 94 energizes the solenoid 56 which swings the tone arm 14 to the starting position and also energizes the solenoid 64 to advance the channel position to a new channel, for example, 16_b_. The solenoid 72 is then released to drop the tone arm to the full line position 14, and finally, the solenoid 56 is released to allow the spiral spring 70 to bias the tone arm 14 in an outward direction.

Alternatively, a cartridge type single coil magnetic record device is provided which is adapted to use a magnetic tape interwound with a narrower separator material such as another tape, or blank material, e.g., plastic or metallic film. The tape is wound about the center core of the plate 22, FIG. 6. The tape 16 has adjacent turns 28 and 30 separated by a separator tape 29. The narrow tape 29 can be thicker than the tape 16 allowing more room for the head 12 to pass between the adjacent turns 28 and 30. The tape 16 is shown as a two-sided tape which may be used for doubling the play times in which both sides of the tape 16 are coated with a ferromagnetic film. The transducer head 12 has a pair of heads 12_a_ and 12_b_ operatively associated with the adjacent strips of tape 28 and 30.

The single coil in which the turns are prevented from slipping against one another leads to the ability to record long video segments without reversal of reels, and also gives a convenient cartridge form.

The transducer head 12 is adapted to carry two minature transducer heads 12_a_ and 12_b_, FIG. 6. The heads 12_a_ and 12_b_ are disposed on opposite sides of the transducer head 12 and are adapted to scan record tracks on the adjacent coils of tape 28 and 30. The head 12 has a pointed end 12_c_ which is shaped to start into the record tape 16 with a letter-knife type action. The shape of the head 12 may be such as to permit twisting after the head 12 has been started into the record tape 16 to thereby expose the heads 12_a_ and 12_b_ to the tape.

The record tape may be provided with a yieldable backing instead of relying on the tape material itself for backing. A yieldable or flexible backing can be inserted on the tape opposite the head gap. Alternatively, a vacuum may be provided to give a close pull-in at the gap between the head and the tape.

The disc type magnetic record 16, FIG. 6, includes the narrow separator material 29 between the adjacent turns of the coils 28 and 30. The narrow separator material 29 may be another tape or blank material, for example plastic or a metal. The separator 29 can be thicker than the record tape 16 theyby allowing more room for the head 12. Also contemplated are multichannel record tapes having separated heads whereby when one head is finishing a track, the other head may start before the first head finishes a track and thereby provide uninterrupted recording.

As indicated by the heads 12_a_ and 12_b_ in the transducer head 12, a two sided tape may be used whereby the tape play time is doubled. Each side of the tape is exposed to the scanning by the individual heads 12_a_ and 12_b_. The record tape 16 is coated on both sides.

FIGS. 4 and 5 disclose a modified single roll tape system for video and audio recordings of long duration. A rubber rim 118 provides a flexible inner band to maintain the inside of the self supporting tape coil 116. The coil 116 is an open tape stack accessible from either side. The open stack system generally indicated at 110 is supported by a roll 124 which is controlled by a shiftable roller support 126. The roll of tape 116 is driven by a drive means 134 connected to the roll 135. The rolls 124, 135 and 136 are plastic or metal and as indicated, one or more rolls, 135 and 136, can be a capstan friction surface for the rim drive. The rim 125 has a surface adapted to be driven by the roll 135 which engages the outer face of the rim 125. A tone arm 140 is disposed between a pair of independent tape deflecting members 140' separated from the tone arm 140. The deflecting members serve to maintain the tape opening for the transducer head 142 mounted on 140 and to absorb irregularities that might otherwise be transmitted to the back of the head 142. The front of the head 142 is biased against the tape by the spring 144 as shown.

In operation, a head indexer similar to that of FIG. 3 is used to lift and adjust the tone arms 114 and 140 vertically or the arms may be operated manually. The tone arms 114 and 140 move radially and are controlled in the horizontal direction by a horizontal head control (not shown). The tone arms 114 and 140 may engage the coil 116 from either side. The use of two tone arms provides continuous scanning with no interruption on different portions of the coil 116.

With respect to the open tape coil, FIG. 4, an alternative configuration of the tape 116 with respect to a separator tape 129 is shown in enlarged form in FIG. 7. The roll 124 is wide enough to maintain the sides of the tape stack 116 in alignment. The tone arms 114 and 140 may engage the tape 116 from both sides of the stack and move radially to move into scanning relation to the tape at the inner and outer portions of the coil 116. The coil 116 is retained by the roll 124 in its wound configuration regardless of whether the turns are held apart by a separator, or whether they are together as previously described. The tone arm 114 with the head 112 is accommodated between the layers such as 128, 130 of tape that comprise the turns of the coil 116 and thereby the head 112 is placed into scanning relation with the record tape. The inner rim 118 is of flexible material such as a soft rubber and capable of deforming to accommodate the deflection of the tape due to the insertion of the head between the tape layers 128, 130. The self supporting coil 116 of record tape has an inner end joined to the inner rim 118 and an outer end joined to the outer rim 125. The adjacent turns may be separated by a separator tape 129, FIG. 7, similar to the separator 29, FIG. 6. The separator tape 129 may be adhered to the layers 128, 130 to form a self supporting roll in FIG. 7 that does not require any support structure as the plate 22 of FIG. 2.

The transducer head suitable for use in the single coil system of the invention is provided with a pair of heads **113*a* and 113*b*, FIG. 7. The miniature heads 113*a* and 113*b* are secured on the head or stylus 112. The stylus makes an opening for the heads 113*a*, 113*b* at an intermediate portion of the tape stack 116. The head itself can be shaped to start into the tape stack with letter-knife type end shape 113*c***.

The self supporting roll of record tape 116 may be driven by a plurality of flanged rolls 135 engaging the rim 125 of the self supporting roll of record tape 116. The rim 125 and the rolls 135 are frictionally engaged and may be plastic or metal. The roll 135 constitutes a cap stan friction service for the rim drive.

Alternatively, it is envisioned to have an open tape stack having a radial plate member separated by an axial distance sufficient to allow a guide or head to be inserted between the stack and plate from the deformable inner rim.

Although minor modifications might be suggested by those versed in the art, it should be understood that I wish to embody within the scope of the patent warranted hereon all such embodiments as reasonably and properly come within the scope of my contribution to the art.

I claim as my invention:

1. A tape transducer system, comprising:

(a) means for supporting a coil of record tape for rotation about a central axis;

(b) record tape scanning means including a scanning head insertable between adjacent turns of such a coil for longitudinal scanning of the record tape as the coil is rotated, with the tape of such coil being movable in either direction with respect to said head; and (c) pair of tape deflecting members arranged for disposition between the same adjacent turns of such a coil as said head and longitudinally spaced in tape direction at respective sides of said head, said deflecting members being constructed for engagement with both of the adjacent coil turns, said head being mounted independently of said deflecting members whereby force is transmitted to said members in the direction of tape motion and is not transmitted therefrom to said head.

2. A tape transducer system according to claim 1, wherein said head is arranged for operative engagement with the inner face of the outermost of said adjacent turns of such a coil, and means resiliently biasing said head in a radial direction toward such an inner tape face.

3. A tape transducer system according to claim 1, wherein said tape deflecting members have tape-engaging portions which are symmetrically shaped and symmetrically disposed with respect to said head.

4. A tape transducer system according to claim 1, constructed for use with record tape carrying multiple recording tracks, comprising in further combination indexing means controlling the position of said head for selective cooperation with individual tracks of such a record tape.

5. A tape transducer system according to claim 4 comprising in further combiation automatic resetting means for said scanning means to reset said scanning means to the beginning position in said coil when said head reaches a predetermined position within said coil.

References Cited

UNITED STATES PATENTS 3,388,911 6/1968 Wilson et al. ---------- 294—4

FOREIGN PATENTS 1,140,739 12/1962 Germany.

HARRY N. HAROIAN, Primary Examiner

U.S. Cl. X.R.

274—41.4